United States Patent
Li

(10) Patent No.: US 12,108,063 B2
(45) Date of Patent: Oct. 1, 2024

(54) VIDEO PROCESSING CIRCUIT AND VIDEO PROCESSING METHOD

(71) Applicant: SigmaStar Technology Ltd., Xiamen (CN)

(72) Inventor: Shan Li, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 113 days.

(21) Appl. No.: 17/968,281

(22) Filed: Oct. 18, 2022

(65) Prior Publication Data

US 2023/0276062 A1   Aug. 31, 2023

(30) Foreign Application Priority Data

Feb. 28, 2022  (CN) .......................... 202210188494.5

(51) Int. Cl.
*H04N 19/423*  (2014.01)
*H04N 19/146*  (2014.01)
*H04N 19/176*  (2014.01)

(52) U.S. Cl.
CPC ......... *H04N 19/423* (2014.11); *H04N 19/146* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 4,847,758 A | * | 7/1989 | Olson | G06F 12/0862 711/3 |
| 8,863,187 B2 | * | 10/2014 | Ho | H04N 21/4263 725/38 |
| 10,855,998 B1 | * | 12/2020 | Sarwer | H04N 19/117 |
| 2006/0233252 A1 | * | 10/2006 | Bhattacharya | H04N 19/172 375/E7.181 |
| 2013/0272409 A1 | * | 10/2013 | Seregin | H04N 19/51 375/240.16 |
| 2017/0150159 A1 | * | 5/2017 | Lee | H04N 19/52 |

* cited by examiner

*Primary Examiner* — Clifford Hilaire
(74) *Attorney, Agent, or Firm* — WPAT, P.C

(57) ABSTRACT

A video processing circuit coupled to an external memory and for generating a video stream is provided. The external memory stores a part of a first frame. The video processing circuit includes a memory, a control circuit, an image processing circuit, and a video encoding circuit. The control circuit is used for reading a first image block from the external memory and storing the first image block in the memory, the first image block being a part of the first frame. The image processing circuit is used for reading the first image block from the memory and processing the first image block to generate a second image block which is a part of the second frame different from the first frame. The video encoding circuit is used for reading the first image block from the memory and encoding the first image block to generate a part of the video stream.

15 Claims, 13 Drawing Sheets

FIG. 7A

VIDEO PROCESSING CIRCUIT AND VIDEO PROCESSING METHOD

BACKGROUND OF THE INVENTION

1. Field of the Invention

The present invention generally relates to image processing, and, more particularly, to the generation of video streams.

2. Description of Related Art

FIG. 1 shows a functional block diagram of a conventional video processing circuit 100. The video processing circuit 100 includes an image processing circuit 110, a memory 122, a memory 124, a memory 126, and a video encoding circuit 130. The video processing circuit 100 processes the input data Din to generate a video stream Dout_M, a video stream Dout_S1, a video stream Dout_S2, . . . . The image processing circuit 110 processes the input data Din to generate the source data Din_M of the video stream Dout_M, the source data Din_S1 of the video stream Dout_S1, and the source data Din_S2 of the video stream Dout_S2. The source data Din_M (source data Din_S1 or source data Din_S2) includes multiple frames which are sequentially stored in the memory 122 (memory 124 or memory 126) from which the video encoding circuit 130 can obtain the frames. The video encoding circuit 130 encodes the source data Din_M, the source data Din_S1, and the source data Din_S2 to generate the video stream Dout_M, the video stream Dout_S1, and the video stream Dout_S2, respectively.

As shown in FIG. 1, the memory 122 includes two memory blocks: a memory block 122a and a memory block 122b, one of which stores the $(N-1)^{th}$ frame of the source data Din_M, and the other of which stores the $N^{th}$ frame of the source data Din_M. Similar may be said with respect to the memory 124 and the memory 126 and shall be omitted herein. In other words, for any video stream (Dout_M, Dout_S1, Dout_S2, or others), the video processing circuit 100 needs to store at least two complete frames of the source data of the video stream at the same time, which undoubtedly consumes a lot of system resources and hence makes the product less competitive. This disadvantage becomes more pronounced when the video processing circuit 100 outputs more video streams.

Reference is made to FIG. 2, which is a timing diagram of the data of FIG. 1. The falling edges of the clock signal CLK (i.e., the time point t2, time point t4, time point t6, . . . ) indicate the beginning of the frames, and the rising edges of the clock signal CLK (i.e., the time point t1, time point t3, time point t5, . . . ) indicate the end of the frames. In this example, the image processing circuit 110 includes three sub-circuits (which process the input data Din to generate the source data Din_M, the source data Din_S1, and the source data Din_S2, respectively), so the image processing circuit 110 can output the $(N-1)^{th}$ frame M(N-1) (gray) of the source data Din_M, the $(N-1)^{th}$ frame S1(N-1) (gray) of the source data Din_S1, and the $(N-1)^{th}$ frame S2(N-1) (gray) of the source data Din_S2 at the same time between the time point t2 and the time point t3 and output the $N^{th}$ frame M(N) (gray) of the source data Din_M, the $N^{th}$ frame S1(N) (gray) of the source data Din_S1, and the $N^{th}$ frame S2(N) (gray) of the source data Din_S2 at the same time between the time point t4 and the time point t5. When the image processing circuit 110 generates the $N^{th}$ frame (i.e., between the time point t4 and the time point t5, the $N^{th}$ frame is stored in one of the two memory blocks), the video encoding circuit 130 encodes the $(N-1)^{th}$ frame (i.e., the $(N-1)^{th}$ frame M(N-1) (gray) of the source data Din_M, the $(N-1)^{th}$ frame S1(N-1) (gray) of the source data Din_S1, and the $(N-1)^{th}$ frame S2(N-1) (gray) of the source data Din_S2) stored in the other memory block to generate the $(N-1)^{th}$ frames of the video stream (i.e., M(N-1) (grid), S1(N-1) (grid), and S2(N-1) (grid)). In other words, there is a delay of one frame between the image processing circuit 110 and the video encoding circuit 130.

To sum up, the conventional video processing circuit 100 is not only hardware resources consuming (because the memory needs a lot of space and the image processing circuit 110 includes multiple sub-circuits) but also inefficient (because of the delay).

SUMMARY OF THE INVENTION

In view of the issues of the prior art, an object of the present invention is to provide a video processing circuit and a video processing method, so as to make an improvement to the prior art.

According to one aspect of the present invention, a video processing circuit is provided. The video processing circuit is coupled to an external memory which stores partial data of a first frame. The video processing circuit generates a video stream and includes a memory, a control circuit, an image processing circuit, and a video encoding circuit. The control circuit is configured to read a first image block from the external memory and store the first image block in the memory, the first image block being a part of the first frame. The image processing circuit is configured to read the first image block from the memory and process the first image block to generate a second image block. The second image block is a part of a second frame which is different from the first frame. The video encoding circuit is configured to read the first image block from the memory and encode the first image block to generate a part of the video stream.

According to another aspect of the present invention, a video processing method for generating a video stream according to a first frame is provided. The video processing method includes reading a first image block from an external memory and storing the first image block in a memory, the first image block being a part of the first frame; performing a scaling operation in which the first image block is read from the memory and then processed to generate a second image block, wherein the second image block is a part of a second frame which is different from the first frame; and performing an encoding operation in which the first image block is read from the memory and then encoded to generate a part of the video stream.

According to still another aspect of the present invention, a video processing method for generating a first video stream and a second video stream is provided. The video processing method includes the following steps: reading a first image block of a first frame from an external memory and storing the first image block to an internal memory; processing the first image block to generate a second image block which is a part of a second frame which is different from the first frame; storing the second image block to the external memory; encoding the first image block to generate a part of the first video stream; reading the second image block from the external memory and storing the second image block in the internal memory; and encoding the second image block to generate a part of the second video stream.

The technical means embodied in the embodiments of the present invention can solve at least one of the problems of the prior art; therefore, the present invention can save memory and/or reduce the delay compared with the prior art.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIGS. 7A and 7B show the frame 710 and frame 720, respectively.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a video processing circuit and a video processing method. On account of that some or all elements of the video processing circuit could be known, the detail of such elements is omitted provided that such detail has little to do with the features of this disclosure, and that this omission nowhere dissatisfies the specification and enablement requirements. Some or all of the processes of the video processing method may be implemented by software and/or firmware and can be performed by the video processing circuit or its equivalent. A person having ordinary skill in the art can choose components or steps equivalent to those described in this specification to carry out the present invention, which means that the scope of this invention is not limited to the embodiments in the specification.

Figure 1:
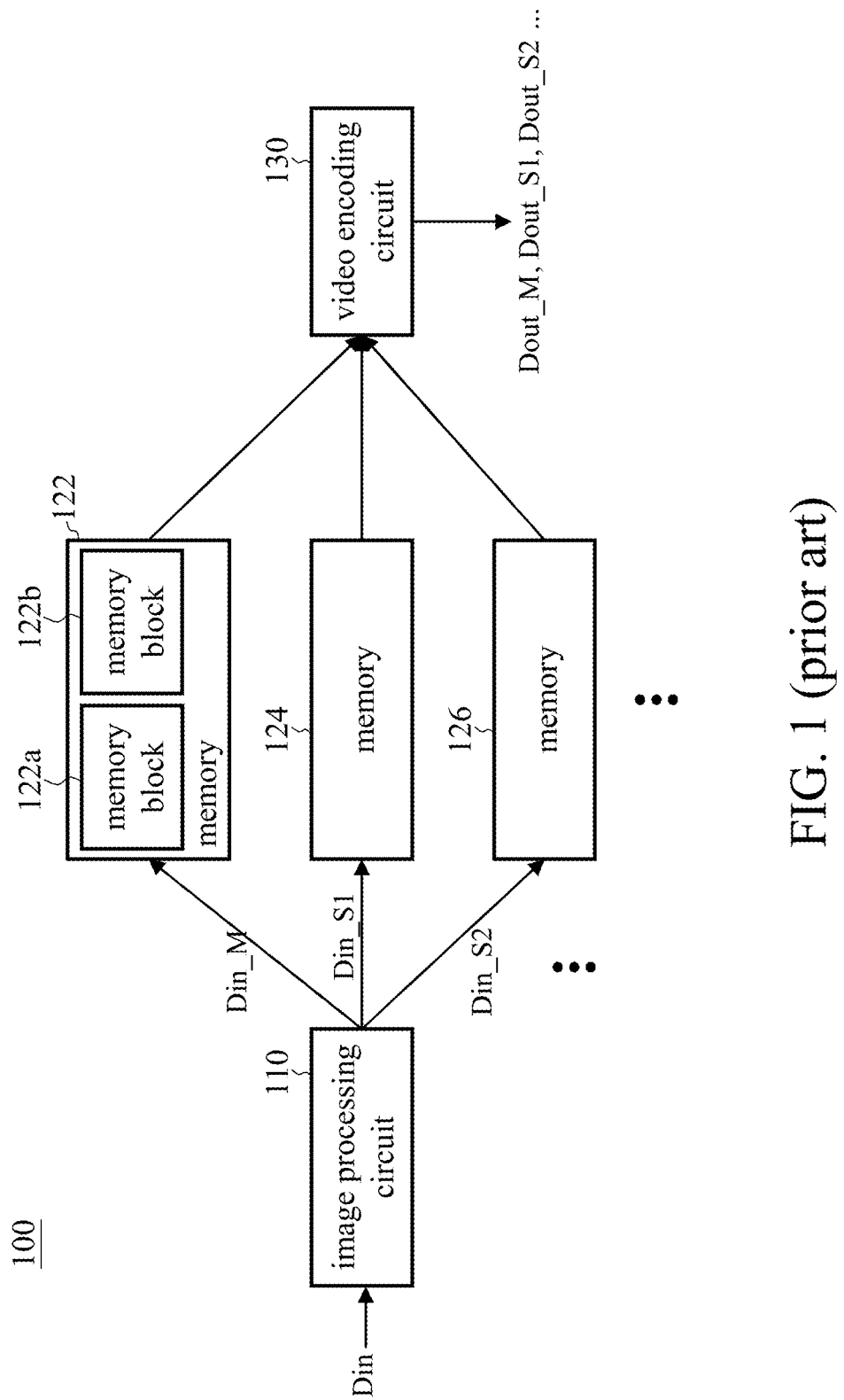
FIG. 1 shows a functional block diagram of a conventional video processing circuit.
Figure 2:
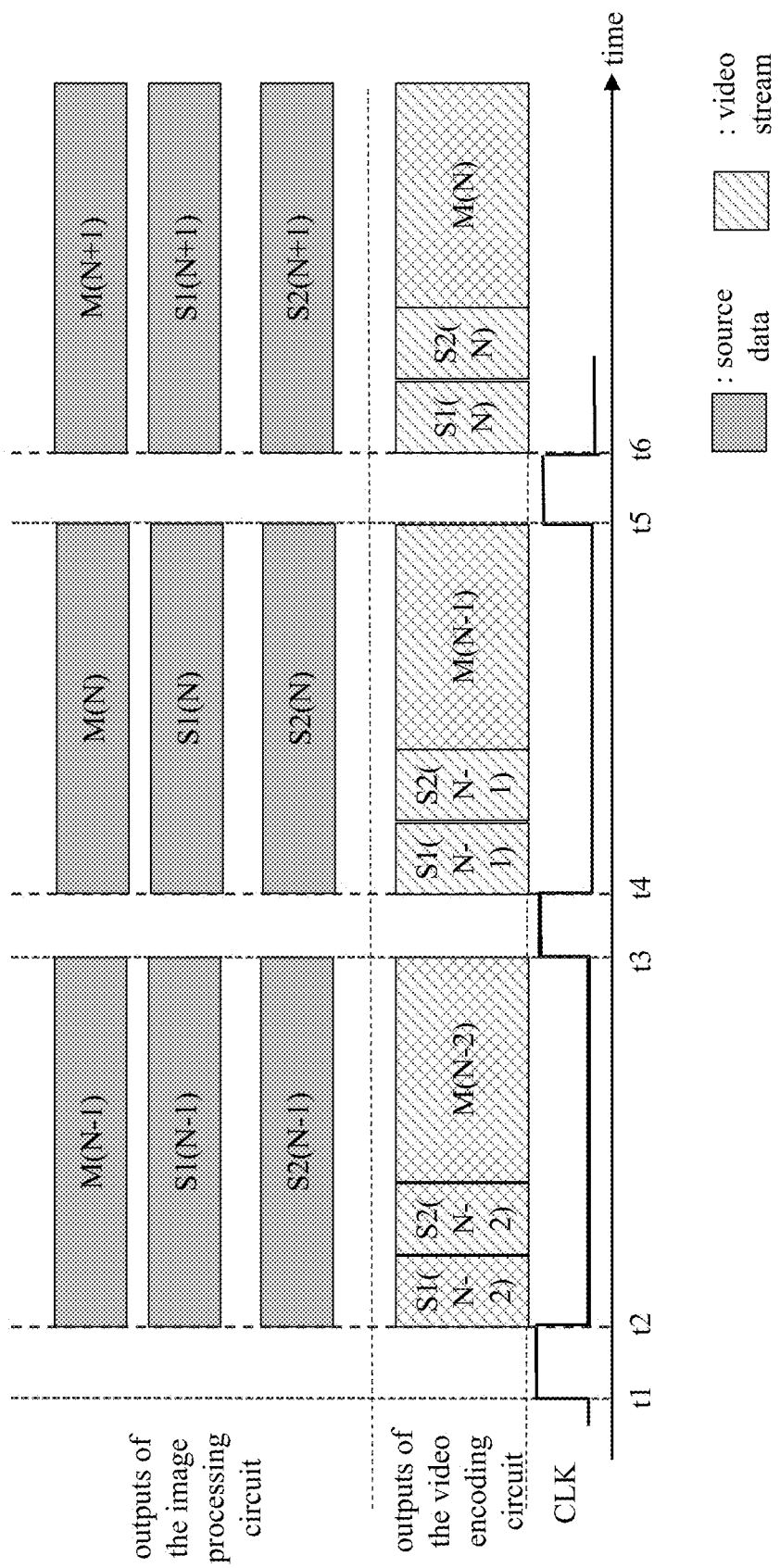
FIG. 2 shows a timing diagram of the data of FIG. 1.
Figure 3:
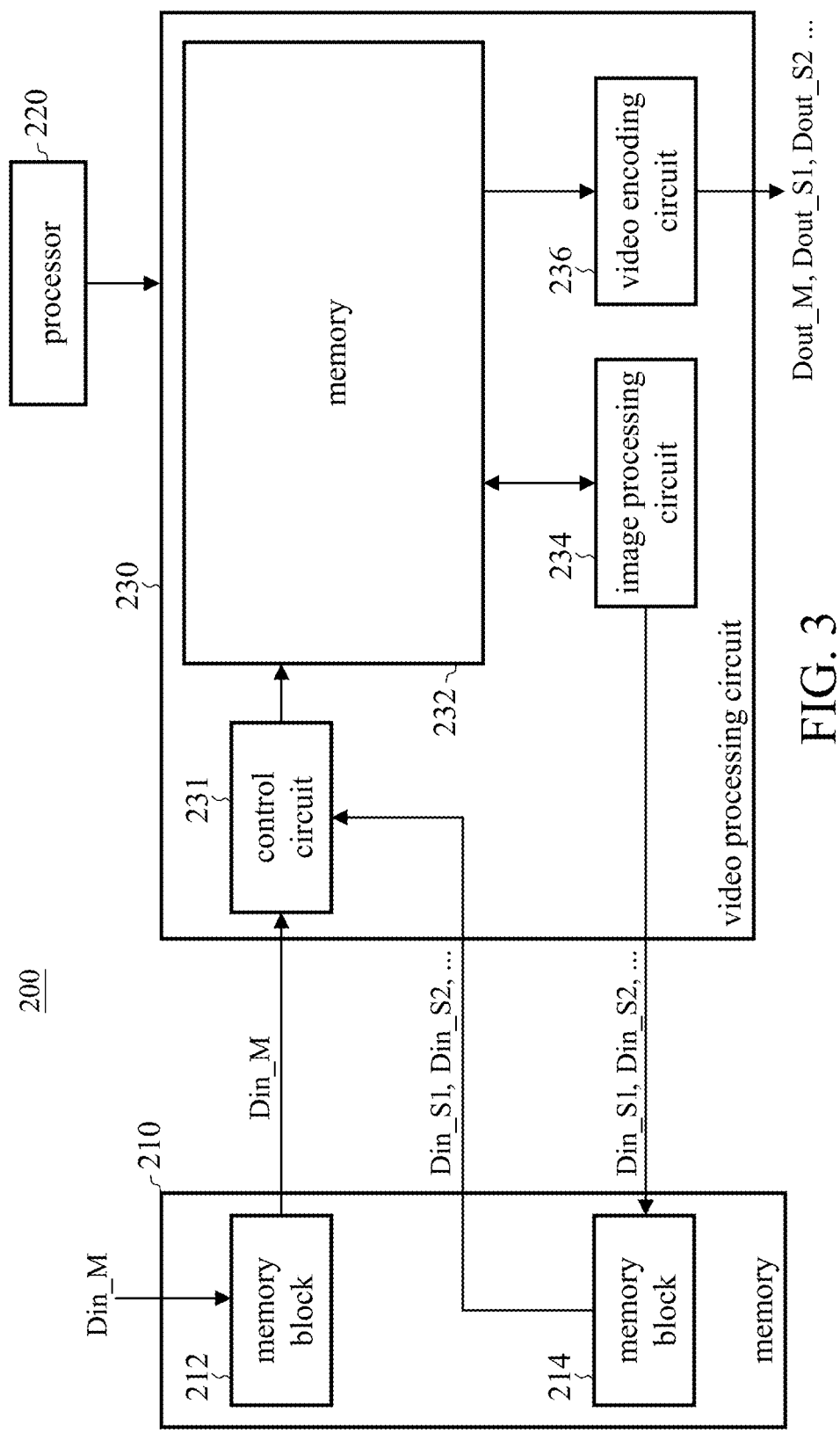
FIG. 3 is a functional block diagram of an image processing system according to an embodiment of the present invention.

FIG. 3 is a functional block diagram of an image processing system 200 according to an embodiment of the present invention. The image processing system 200 includes a memory 210, a processor 220, and a video processing circuit 230.

The memory 210 includes a memory block 212 and a memory block 214. The memory block 212 is configured to store the source data Din_M, and the memory block 214 is configured to store the source data Din_Sx (x=1, 2, 3, . . . ). More specifically, the source data Din_M and the source data Din_Sx each contain several frames; the storage content of the memory block 212 includes all or part of the data of one frame of the source data Din_M, and the storage content of the memory block 214 includes all or part of the data of one frame of the source data Din_Sx. The source data Din_M may be data that has not been scaled (e.g., the output image of an image sensor) or data that has been scaled (e.g., the output image that has been reduced in size).

The video processing circuit 230 includes a control circuit 231, a memory 232, an image processing circuit 234, and a video encoding circuit 236. In some embodiments, the memory 210 is dynamic random access memory (DRAM), and the memory 232 is static random access memory (SRAM).

For the video processing circuit 230, the memory 210 is an external memory, while the memory 232 is an internal memory.

Figure 4:
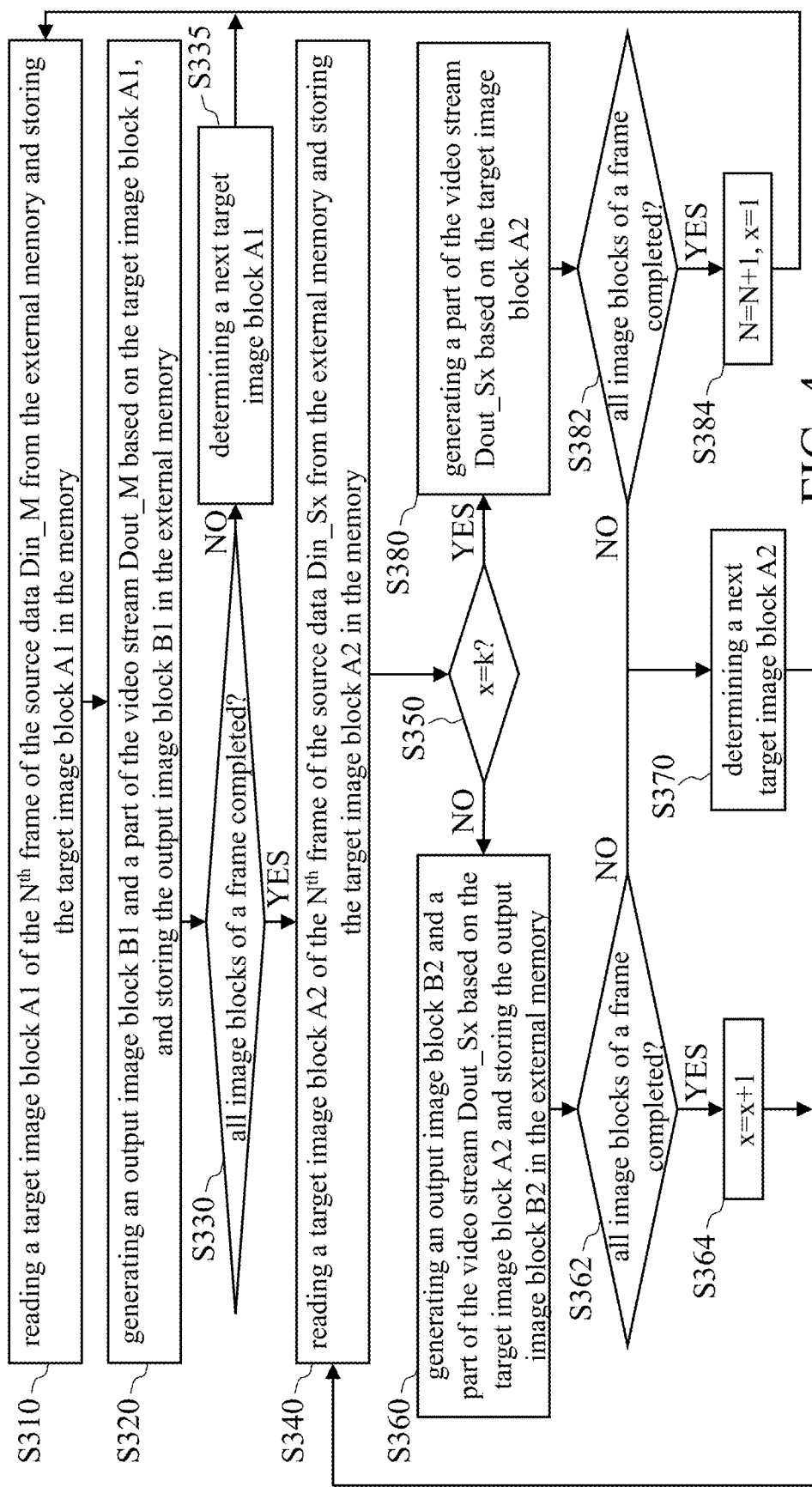
FIG. 4 is a flowchart of a video processing method according to an embodiment of the present invention.
Figure 5:
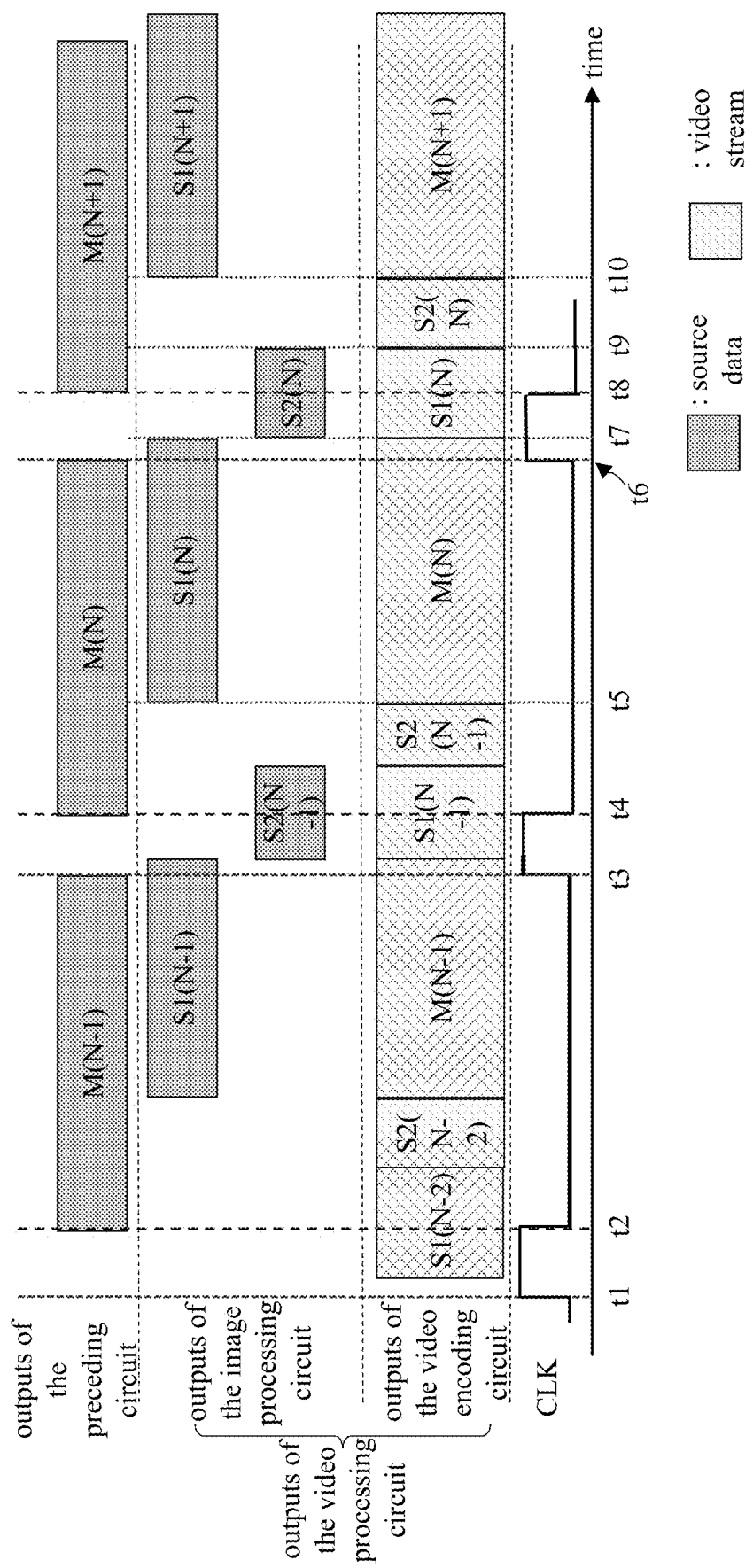
FIG. 5 shows an example of a timing diagram of the data of FIGS. 3 and 4.

FIG. 4 is a flowchart of a video processing method according to an embodiment of the present invention. It is assumed in FIG. 4 that the video processing circuit 230 generates k+1 video streams (i.e., Dout_M, Dout_S1, Dout_S2, . . . , Dout_Sk, k being an integer greater than 1). FIG. 5 is an example of a timing diagram of the data of FIGS. 3 and 4. In the example of FIG. 5, k is 2. Likewise, the falling edges of the clock signal CLK (i.e., the time point t2, time point t4, time point t8, . . . ) indicate the beginning of the frames, and the rising edges of the clock signal CLK (i.e., the time point t1, time point t3, time point t6, . . . ) indicate the end of the frames. The operations of the video processing circuit 230 are detailed below in connection with FIGS. 4 and 5.

Step S310: The control circuit 231 reads a target image block A1 of the $N^{th}$ frame of the source data Din_M (i.e., the frame M(N) (gray)) from the external memory (more specifically, from the memory block 212) and stores the target image block A1 in the memory 232. The storage content of the memory block 212 includes part of the data (e.g., at least one image block) or all the data of the $N^{th}$ frame of the source data Din_M, and the control circuit 231 can copy or move the part of the data of the $N^{th}$ frame (i.e., the target image block A1) to the memory 232 when executing step S310.

Step S320: The image processing circuit 234 and the video encoding circuit 236 respectively generate an output image block B1 (i.e., a part of the $N^{th}$ frame S1(N) (gray) of the source data Din_S1) and a part of the video stream Dout_M (i.e., a part of the $N^{th}$ frame M(N) (grid) of the video stream Dout_M) based on the target image block A1, and the image processing circuit 234 stores the output image block B1 in the external memory (more specifically, in the memory block 214). For example, this step may correspond to the period between the time point t5 and the time point t7 in FIG. 5. The video processing circuit 230 performs image processing based on the image blocks. After processing a target image block A1, the video processing circuit 230 stores the output image block B1 in the memory block 214 and outputs a corresponding video stream. In some embodiments, the generation of the $N^{th}$ frame M(N) (grid) of the video stream Dout_M and the generation of the $N^{th}$ frame S1(N) (gray) of the source data Din_S1 start at substantially the same time (the time point t5) and are completed at substantially the same time (the time point t7).

Since the video processing circuit 230 performs image processing based on image blocks (rather than frames), the generation of the $N^{th}$ frame S1(N) (gray) of the source data Din_S1 and the generation of the $N^{th}$ frame M(N) (grid) of the video stream Dout_M can start as early as the time point t5, instead of having to wait for the end of the $N^{th}$ frame M(N) (gray) of the source data Din_M (i.e., the time point t6). In one embodiment, the video processing circuit 230 and its preceding circuits (e.g., an image signal processor or a scaling circuit, not shown) access the memory block 212 in a ring buffer manner to achieve this purpose. The principle and operational details of the ring buffer are well known to people having ordinary skill in the art and thus omitted for brevity. To sum up, since the image processing circuit 234 and the video encoding circuit 236 share the target image block A1 in the memory 232, before the image processing circuit 234 and the video encoding circuit 236 respectively generate the output image block B1 and a part of the video stream Dout_M, the control circuit 231 writes the target image block A1 (which is read from the external memory) into the memory 232 only once, thereby reducing the bandwidth requirement of the video processing circuit 230 for the external memory.

Step S330: Determining whether the image processing circuit 234 and the video encoding circuit 236 have completed all image blocks of a frame. If NO, determining a next target image block A1 (step S335) and returning to step S310; if YES, proceeding to step S340.

Step S340: The control circuit 231 reads a target image block A2 of the $N^{th}$ frame of the source data Din_Sx from the external memory (more specifically, from the memory block 214) and stores the target image block A2 in the memory 232. The storage content of the memory block 214 includes part of the data (e.g., at least one image block) or all the data of the $N^{th}$ frame of the source data Din_Sx, and the control circuit 231 can copy or move the part of the data of the $N^{th}$ frame (i.e., the target image block A2) to the memory 232 when executing the step S340.

Step S350: If the video processing circuit 230 is processing the $N^{th}$ frame of the last video stream (i.e., x=k, in other words, all the $N^{th}$ frames of the source data Din_M, the source data Din_S1, the source data Din_S2, . . . , and the source data Din_Sk−1 have been processed and the corresponding video streams have been generated), then steps S380 to S384 are performed; otherwise, steps S360 to S364 are performed.

Step S360: The image processing circuit 234 and the video encoding circuit 236 respectively generate an output image block B2 (i.e., a part of the $N^{th}$ frame of the source data Din_Sx+1) and a part of the video stream Dout_Sx based on the target image block A2, and the image processing circuit 234 stores the output image block B2 in the external memory (more specifically, in the memory block 214).

Step S362: Determining whether all image blocks of a frame are completed via the image processing circuit 234 and the video encoding circuit 236. If NO, determining a next target image block A2 of the $N^{th}$ frame of the source data Din_Sx (step S370) and then returning to step S340; if YES, proceeding to step S364.

Step S364: Setting x=x+1, and then returning to step S340 to continue processing the $N^{th}$ frame of the next video stream.

Steps S360 to S364 may correspond to the period between the time point t7 and the time point t9 in FIG. 5. More specifically, the target image block A2 is an image block of the frame S1(N) (gray), a part of the video stream Dout_Sx is a part of the $N^{th}$ frame S1(N) (grid) of the video stream Dout_S1, and the output image block B2 is a part of the $N^{th}$ frame S2(N) (gray) of the source data Din_S2. Similarly, because the video processing circuit 230 performs image processing based on image blocks (i.e., after processing a target image block A2, the video processing circuit 230 stores the output image block B2 in the memory block 214 and outputs a corresponding video stream), the generation of the frame S1(N) (grid) and the generation of the frame S2(N) (gray) start at substantially the same time (the time point t7) and are completed at substantially the same time (the time point t9).

Step S380: The video encoding circuit 236 generates a part of the video stream Dout_Sx based on the target image block A2. Step S380 may correspond to the period between the time point t9 and the time point t10 in FIG. 5. More specifically, the target image block A2 is an image block of the frame S2(N) (gray), and the part of the video stream Dout_Sx is a part of the $N^{th}$ frame S2(N) (grid) of the video stream Dout_S2.

Step S382: Determining whether all image blocks of a frame are completed via the video encoding circuit 236. If NO, determining a next target image block A2 of the $N^{th}$ frame of the source data Din_Sx (step S370) and then returning to step S340; if YES, proceeding to step S384.

Step S384: Setting N=N+1 and resetting x to 1, and then returning to step S310 to continue processing the next frame (i.e., the $(N+1)^{th}$ frame).

To sum up, except for the original source data Din_M (which is not generated by the video processing circuit 230), other source data (the source data Din_S1, source data Din_S2, . . . ) which are generated by the video processing circuit 230 are all stored in the memory block 214; in other words, the source data generated by the video processing circuit 230 share the memory block 214 to save memory. In addition, the video processing circuit 230 can also reduce the delay (i.e., the generation of the $N^{th}$ frame M(N) (grid) of the video stream Dout_M starts at the time point t5, rather than after the time point t6).

In some embodiments, step S340 and step S360 may be performed simultaneously or partially simultaneously. For example, the memory block 214 functions as a ring buffer for the control circuit 231 and the image processing circuit 234 to access.

Figure 6:
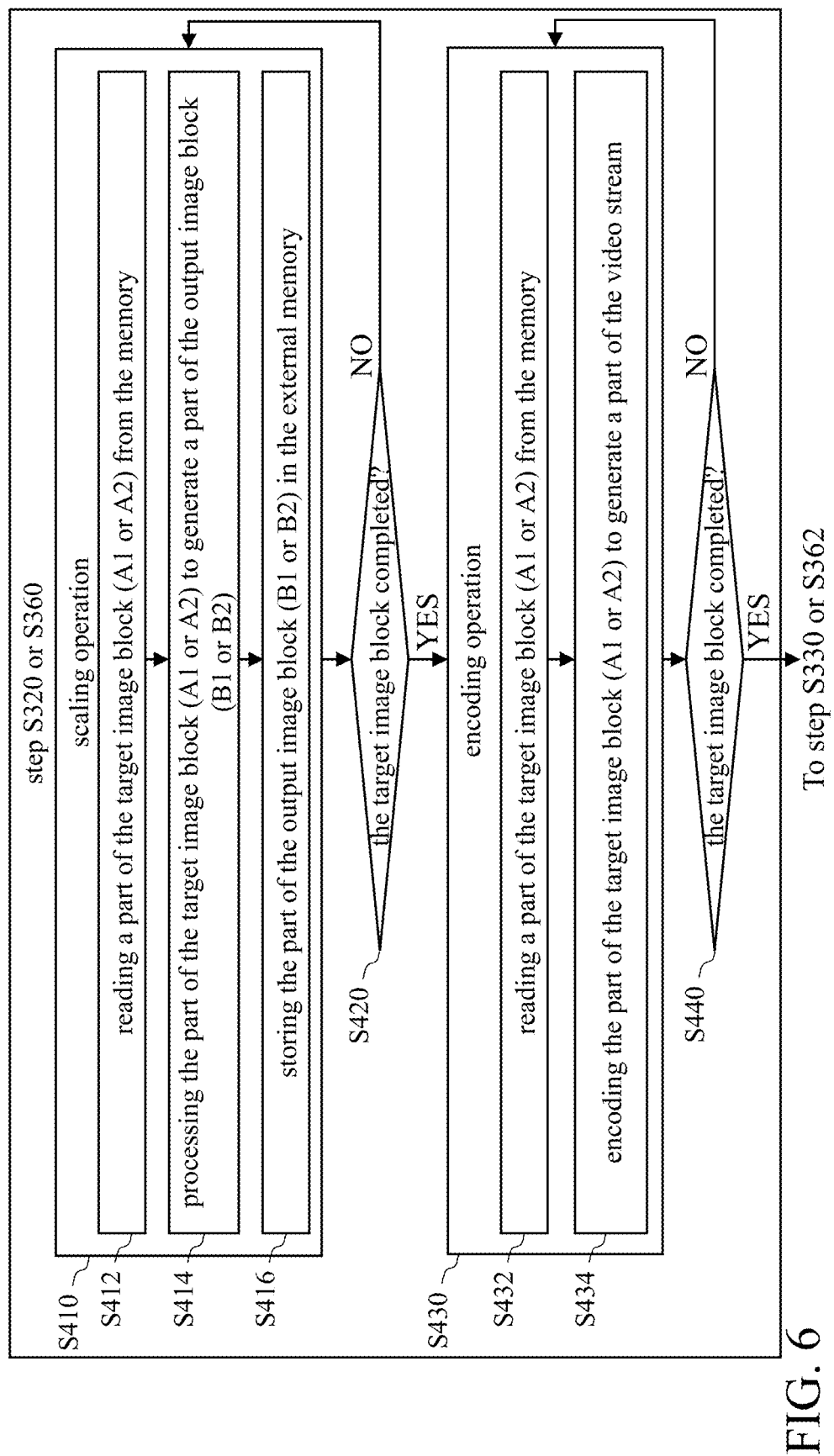
FIG. 6 shows a flowchart of step S320 or S360 of FIG. 4 according to an embodiment.

FIG. 6 is a flowchart of step S320 or S360 of FIG. 4 according to an embodiment. FIG. 6 includes the following steps.

Step S410, a scaling operation is performed by the image processing circuit 234, and includes sub-steps S412, S414, and S416.

Figure 7A:
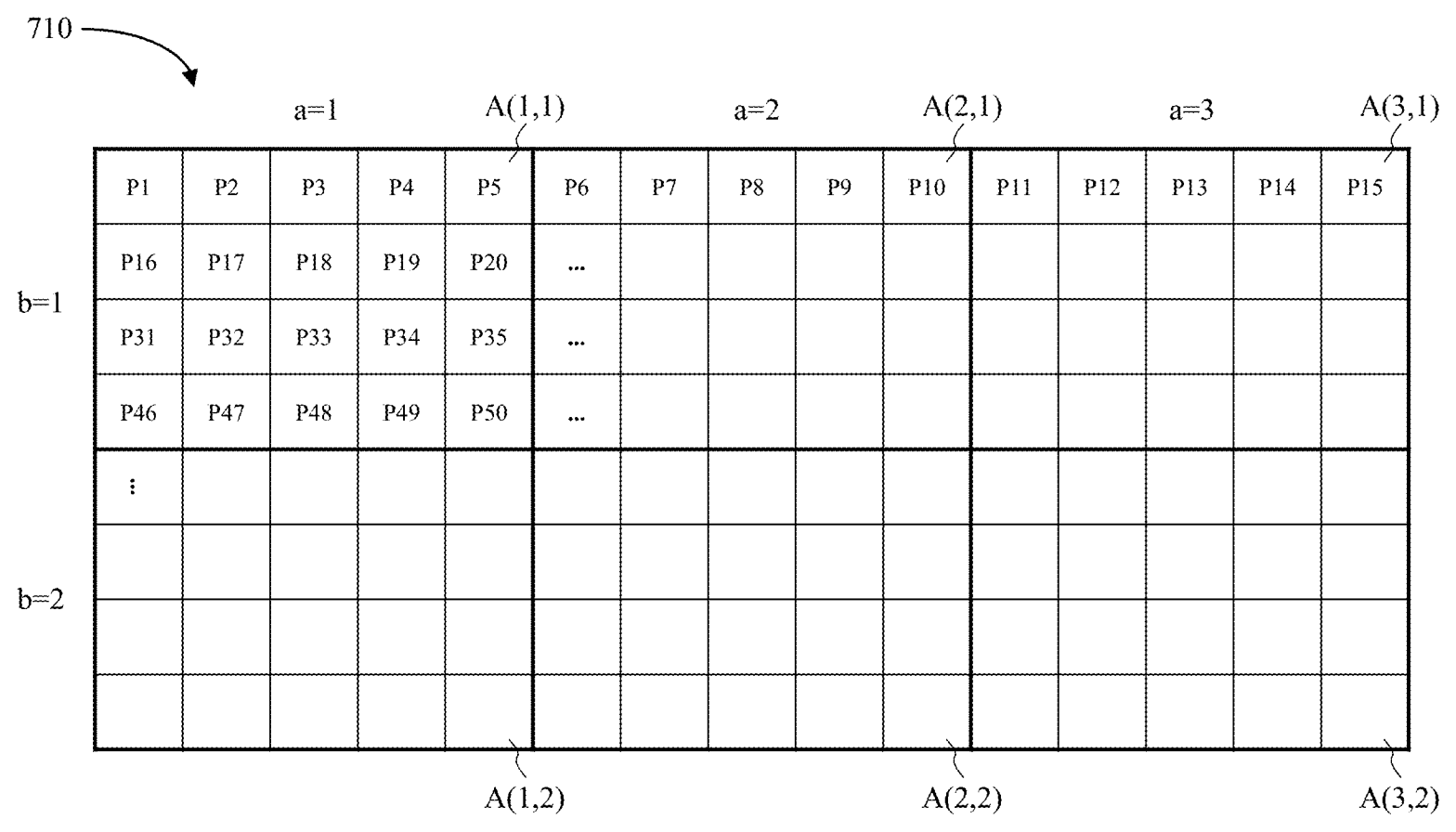
Figure 7B:
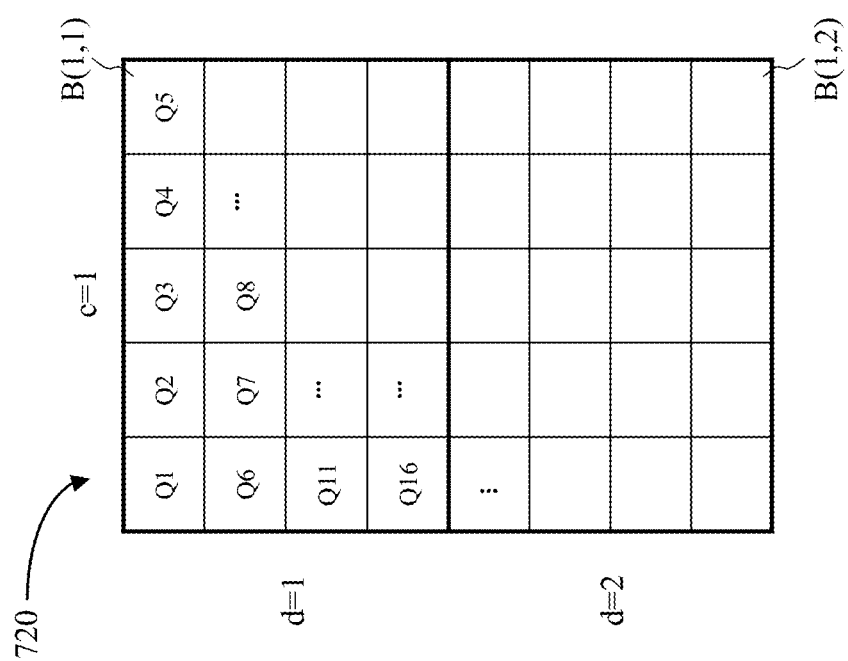

Step S412: Reading a part of the target image block (A1 or A2) from the memory 232. Reference is made to FIGS. 7A and 7B, which show the frame 710 and the frame 720, respectively. The frame 710 is the $N^{th}$ frame of the source data Din_M or the $N^{th}$ frame of the source data Din_Sx, and the frame 720 is the $N^{th}$ frame of the source data Din_S1 or the $N^{th}$ frame of the source data Din_Sx+1. In the example of FIGS. 7A and 7B, the frame 710 includes 6 image blocks (A(a,b), 1≤a≤3, 1≤b≤2), each image block A(a,b) being selected in sequence as the target image block A1 or the target image block A2 in FIG. 4), and the frame 720 includes 2 image blocks (B(c,d), c=1, 1≤d≤2, each image block B (c,d) can be the output image block B1 or the output image block B2 in FIG. 4). The storage content of the memory 232 includes at least one image block. Each time performing this step, the image processing circuit 234 reads one row of data of the target image block for processing. For example, if the target image block is A(1,1), the image processing circuit 234, each time performing this step, reads the pixel data P1 to P5, P16 to P20, P31 to P35, or P46 to P50.

Step S414: Processing the part of the target image block (A1 or A2) to generate a part of the output image block (B1 or B2). The output image block is an image block of the frame 720. Taking the scaling-down operation as an example (assuming the scaling-down ratio is 1/3), the image processing circuit 234 executes equation (1) to generate the output image block.

$$Qj=\Sigma_{i=3(j-1)+1}^{3(j-1)+3} Pi/3, j=1,2,3,\ldots \quad (1)$$

It should be noted that when processing the pixels in a certain row of the image block A(2,1) (e.g., P6 to P10), the image processing circuit 234 uses (1) some of the pixels in the same row of the adjacent image block A(1,1) (e.g., some of the pixels P1 to P5), or (2) the calculation result obtained based on the pixels in the same row of the adjacent image block A(1,1). Continuing the above example where the pixel Q2 of the frame 720 is (P4+P5+P6)/3 (P4, P5 and P6 being consecutive pixels), for the case (1), when processing the pixels in the first row of the image block A(2,1), the image processing circuit 234 needs the pixel values P4 and P5 of the image block A(1,1); for the case (2), when processing the pixels in the first row of the image block A(2,1), the image processing circuit 234 performs calculation on both the pixel value P6 and the calculation result of the pixel values P4 and P5 (i.e., (P4+P5)/3) at the same time (i.e., to calculate Q2=(P4+P5)/3+P6/3). The pixel values P4 and P5 and/or the calculation result based on the pixel values P4 and P5 ((P4+P5)/3) can be stored in the memory 232 to be used by the image processing circuit 234 when processing the pixels in the first row of the image block A(2,1).

Step S416: The image processing circuit 234 stores the part of the output image block (B1 or B2) in the memory 210 (more specifically, in the memory block 214). For example, the image processing circuit 234 stores the pixel value Q1 in the memory block 214.

Step S420: The image processing circuit 234 determines whether the target image block (A1 or A2) is completed. When the image processing circuit 234 has processed all the rows of the target image block (A1 or A2) (the result of S420 is YES), the flow proceeds to step S430; otherwise, the image processing circuit 234 continues to process the next part of the target image block (A1 or A2).

Step S430, an encoding operation, which includes substeps S432 and S434, is performed by the video encoding circuit 236.

Step S432: The video encoding circuit 236 reads a part of the target image block (A1 or A2) from the memory. The target image block in this step is the same as the target image block (A1 or A2) in step S412; in other words, the same target image block (A1 or A2) is subjected to the scaling process and the encoding process.

Step S434: The video encoding circuit 236 encodes the part of the target image block (A1 or A2) to generate a part of the video stream. In some embodiments, the video encoding circuit 236 performs encoding based on the H.264 standard, which is not detailed herein for being well known to people having ordinary skill in the art.

Step S440: The video encoding circuit 236 determines whether the target image block (A1 or A2) is completed. When the video encoding circuit 236 has processed all the pixels of the target image block (the result of S440 being YES), the process returns to step S330 or S362 in FIG. 4; otherwise, the video encoding circuit 236 continues to process the next part of the target image block.

The details of step S380 in FIG. 4 include steps S430 and S440 in FIG. 6.

It can be known from the above discussions that the image processing circuit 234 and the video encoding circuit 236 operate based on image blocks (i.e., performing block-based operations or processing a frame block by block).

In other embodiments, step S410 and step S430 of FIG. 6 can be interchanged.

In some embodiments, the source data Din_M (or the video stream Dout_M), the source data Din_S1 (or the video stream Dout_S1), the source data Din_S2 (or the video stream Dout_S2), etc. have different resolutions. For example, the resolution of the source data Din_M (or the video stream Dout_M) is greater than that of the source data Din_S1 (or the video stream Dout_S1), and the resolution of the source data Din_S1 (or the video stream Dout_S1) is greater than that of the source data Din_S2 (or the video stream Dout_S2).

The processor 220 can control whether the image processing circuit 234 and/or the video encoding circuit 236 are/is activated according to the frame rate Fx of the video stream Dout_Sx and the frame rate Fx+1 of the video stream Dout_Sx+1. Three of the scenarios are discussed below.

Scenario (1): When the frame rate Fx is identical to the frame rate Fx+1, both the image processing circuit 234 and the video encoding circuit 236 are activated, that is, both the image processing circuit 234 and the video encoding circuit 236 process each frame of the source data Din_Sx (corresponding to the flow of FIG. 4 and FIG. 6).

Figure 8A:
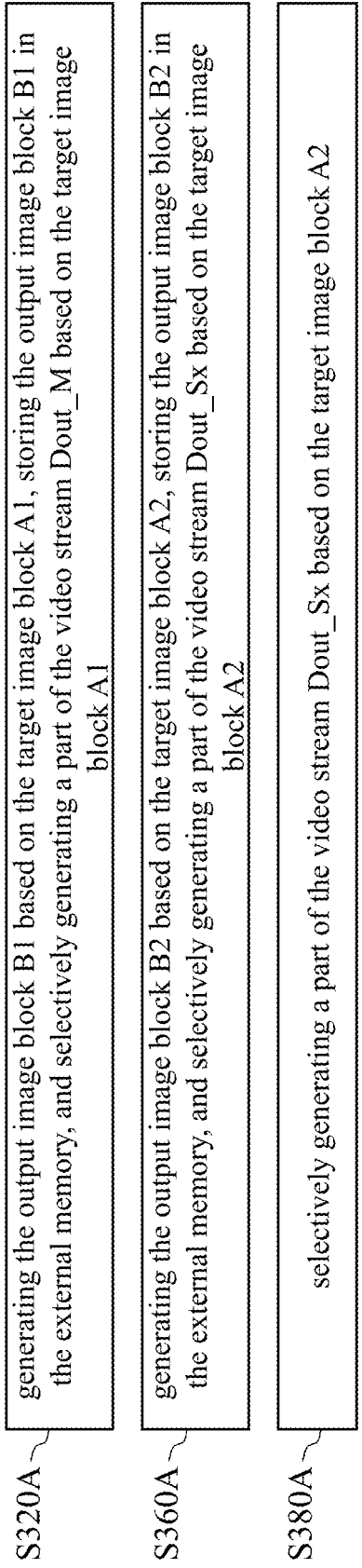
FIG. 8A shows another embodiment of step S320, step S360, and step S380 of FIG. 4.
Figure 9:
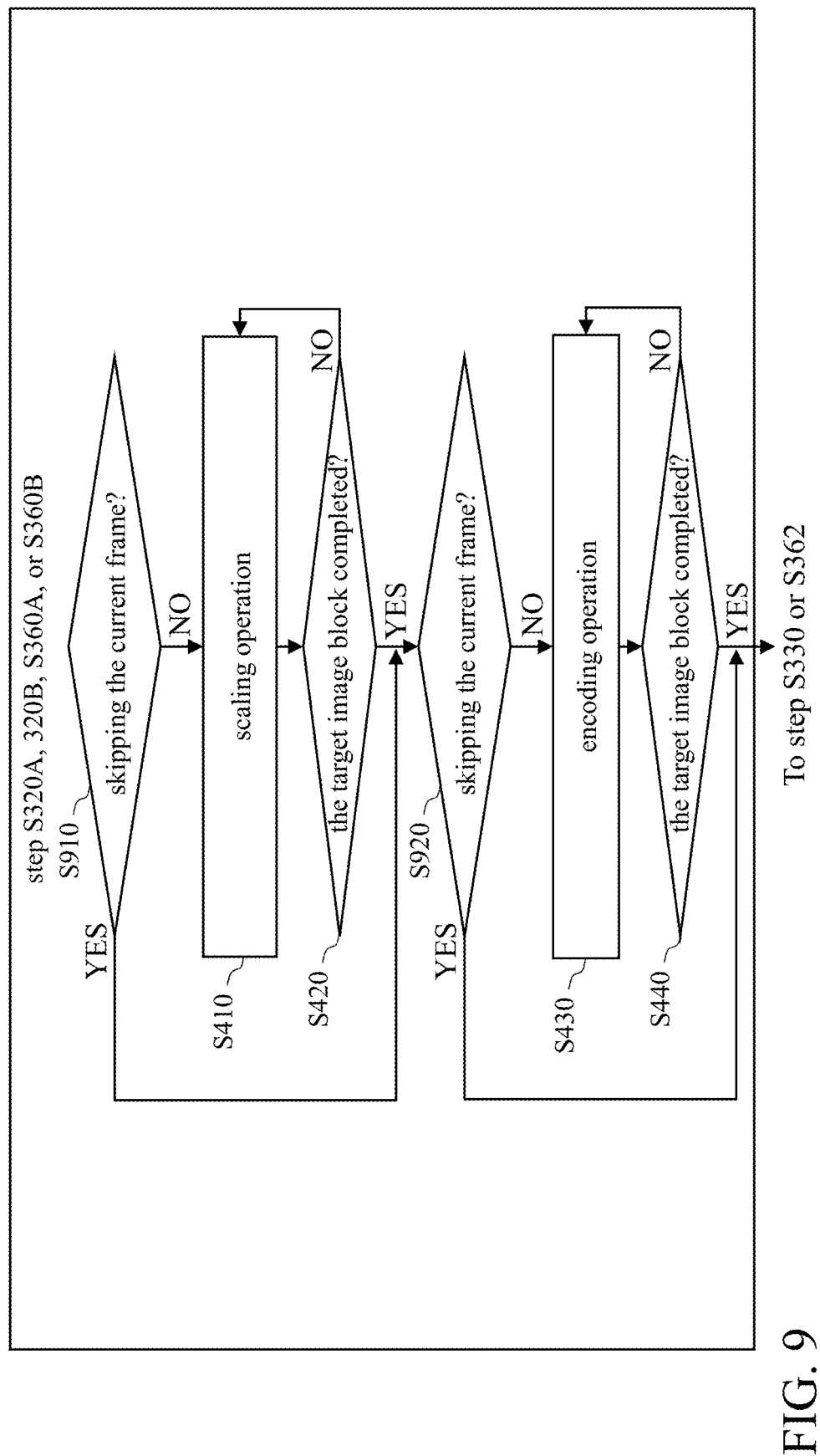
FIG. 9 shows a flowchart of step S320A, S320B, S360A or S360B according to an embodiment.

Scenario (2): When the frame rate Fx is less than the frame rate Fx+1, the image processing circuit 234 processes a certain frame, and the video encoding circuit 236 does not encode that frame. For example, if the frame rate Fx is 30 fps (frame per second), and the frame rate Fx+1 is 60 fps, the image processing circuit 234 processes each frame of the source data Din_Sx, but the video encoding circuit 236 encodes only one of 2 (=60/30) consecutive frames of the source data Din_Sx and skips the other. In this scenario, step S320, step S360, and step S380 in FIG. 4 are replaced by step S320A, step S360A, and step S380A in FIG. 8A, respectively, and two more steps S910 and S920 shown in FIG. 9 are added to the flow of FIG. 6. In step S910, the image processing circuit 234 determines whether to skip the current frame according to a first set value which is generated by the processor 220. If YES, the image processing circuit 234 does not perform a scaling operation on the frame. In step S920, the video encoding circuit 236 determines whether to skip the current frame according to a second set value which is generated by the processor 220. If YES, the video encoding circuit 236 does not encode that frame.

Figure 8B:
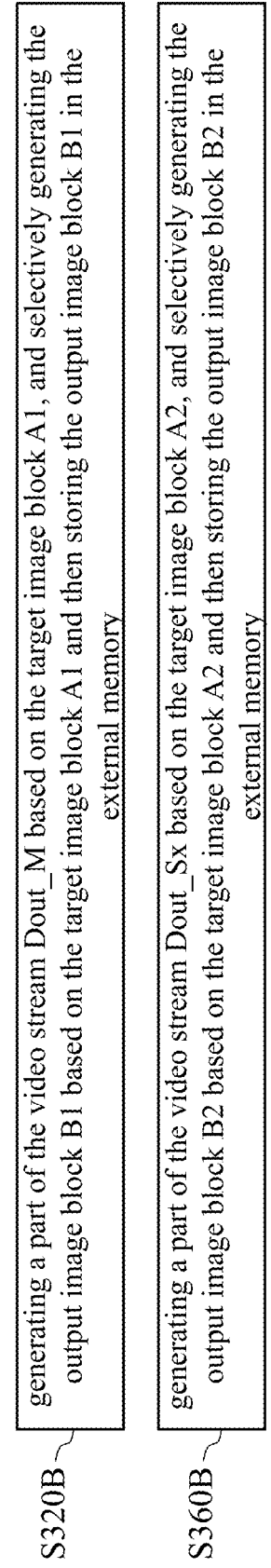
FIG. 8B shows another embodiment of step S320 and step S360 of FIG. 4.

Scenario (3): When the frame rate Fx is greater than the frame rate Fx+1, the video encoding circuit 236 encodes a certain frame, but the image processing circuit 234 does not process that frame. For example, if the frame rate Fx is 60 fps, and the frame rate Fx+1 is 30 fps, the video encoding circuit 236 encodes each frame of the source data Din_Sx, but the image processing circuit 234 processes only one of 2 (=60/30) consecutive frames of the source data Din_Sx and skips the other. In this scenario, step S320 and step S360 in FIG. 4 are replaced by step S320B and step S360B in FIG. 8B, respectively, and the flow of FIG. 6 is replaced by the flow of FIG. 9.

Figure 10:
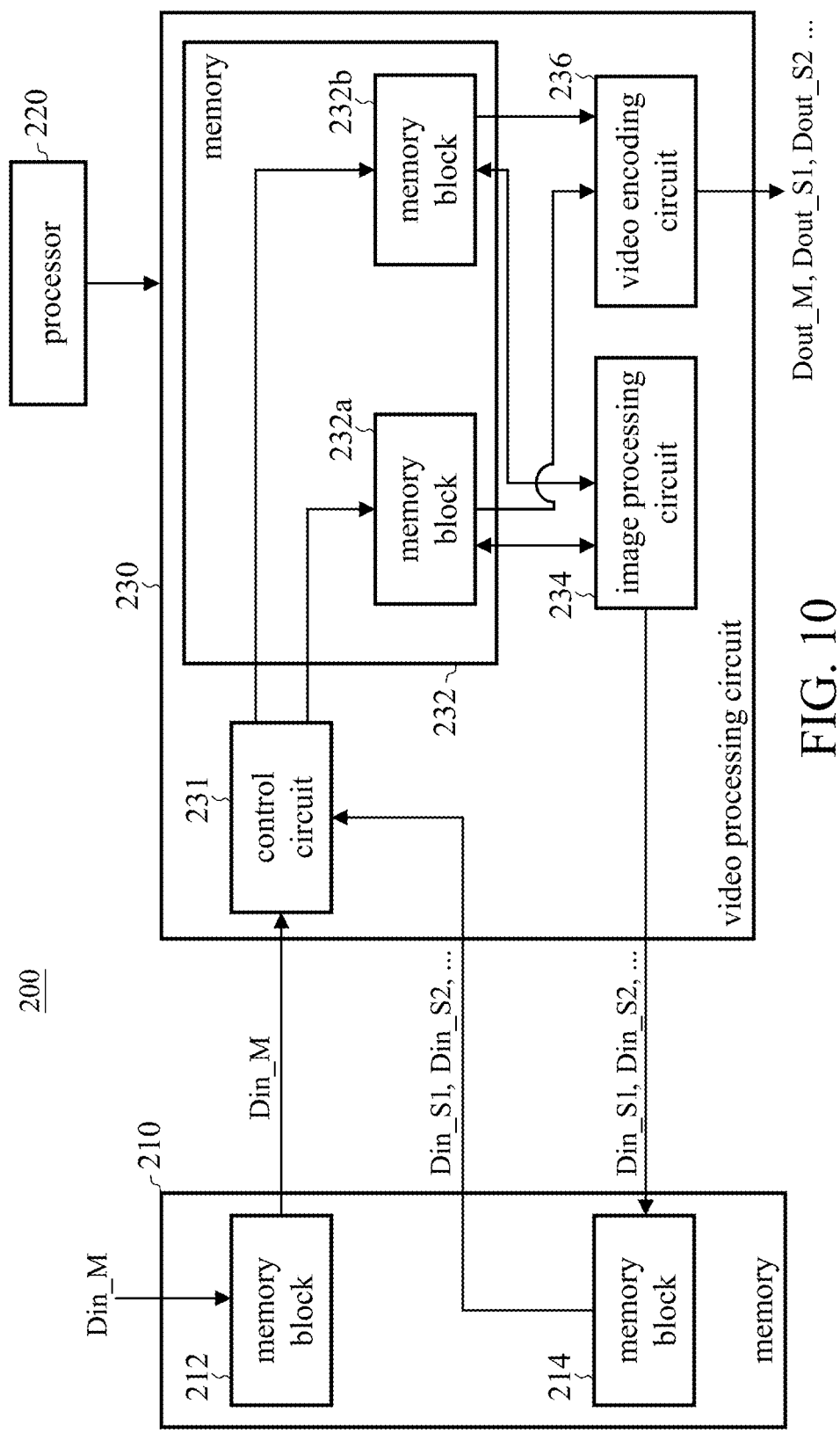
FIG. 10 shows the internal circuit of the memory 232 of FIG. 3.
Figure 11A:
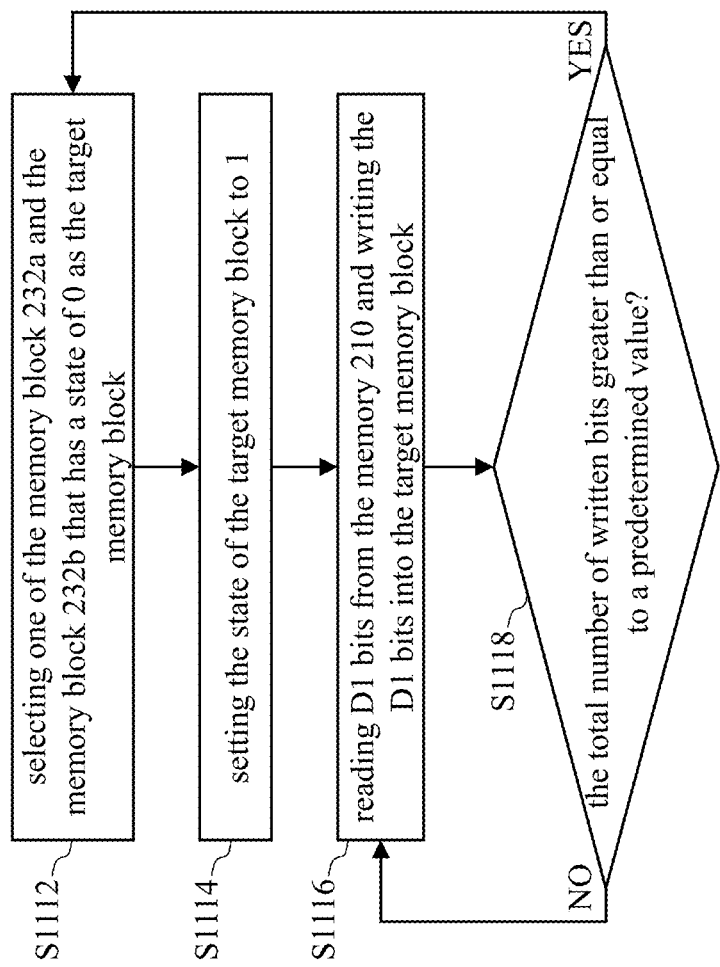
FIG. 11A shows a flowchart of a control circuit reading data from the memory 210 and writing data to the memory 232.
Figure 11B:
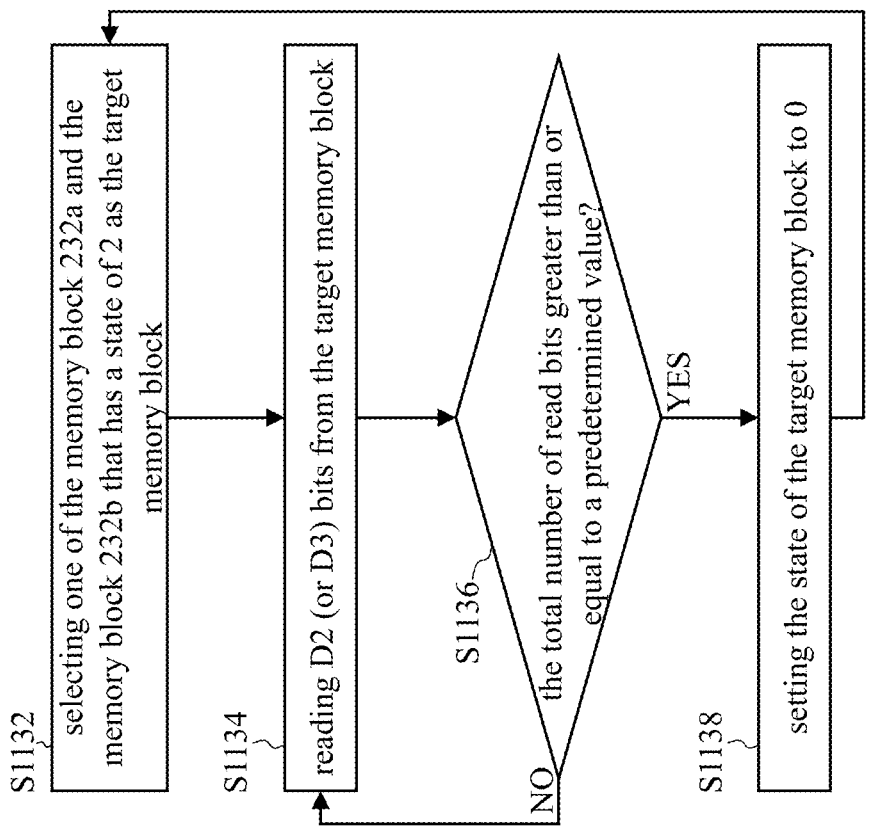
FIGS. 11B and 11C show the flowcharts of an image processing circuit and a video encoding circuit reading data from the memory 232.
Figure 11C:
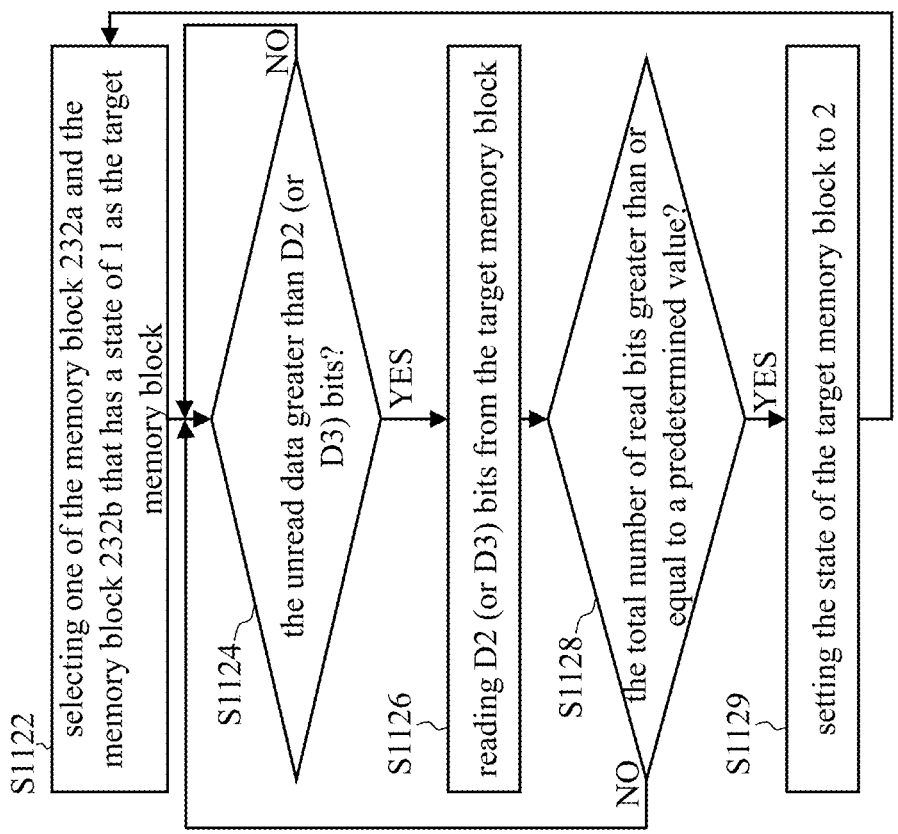

FIG. 10 shows the internal circuit of the memory 232 of FIG. 3. FIG. 10 is substantially the same as FIG. 3 and shows one embodiment of the memory 232. In the embodiment of FIG. 10, the memory 232 includes a memory block 232a and a memory block 232b. The control circuit 231, the image processing circuit 234, and the video encoding circuit 236 are coupled to the memory block 232a and the memory block 232b. The memory block 232a and the memory block 232b are used by the image processing circuit 234 and the video encoding circuit 236 in the form of a double buffer. FIG. 11A shows the flowchart of the control circuit 231 reading data from the memory 210 and writing the data to the memory 232, and FIGS. 11B and 11C show flowcharts of the image processing circuit 234 and the video encoding circuit 236 reading data from the memory 232. The details are discussed below.

FIG. 11A includes the following steps.

Step S1112: The control circuit 231 selects one of the memory block 232a and the memory block 232b that has a state of 0 as the target memory block. The memory block 232a and the memory block 232b have their respective states. In some circumstances, this step may include the control circuit 231 waiting for the state of the memory block 232a or the memory block 232b to change to 0.

Step S1114: The control circuit 231 sets the state of the target memory block to 1.

Step S1116: The control circuit 231 reads D1 bits from the memory 210 and writes the D1 bits into the target memory block.

Step S1118: The control circuit 231 determines whether the total number of bits that it has already written into the target memory block is greater than or equal to a predetermined value. The predetermined value may be an integer multiple of the amounts of data that the control circuit 231, the image processing circuit 234, and the video encoding circuit 236 read or write in their respective single read/write operations. For example, if the amounts of data per read/write operation for the control circuit 231, the image processing circuit 234, and the video encoding circuit 236 are D1, D2, and D3 respectively, the predetermined value may be the least common multiple of D1, D2 and D3. In some embodiments, the predetermined value may be the amount of data of the target image block (A1 or A2) in FIG. 4; in other words, step S1118 being YES means that the control circuit 231 has written the data of a target image block (A1 or A2) into the target memory block.

FIG. 11B includes the following steps.

Step S1122: The image processing circuit 234 or the video encoding circuit 236 selects one of the memory block 232a and the memory block 232b that has the state of 1 as the target memory block. In some circumstances, this step may include the image processing circuit 234 or the video encoding circuit 236 waiting for the state of the memory block 232a or the memory block 232b to change to 1.

Step S1124: The image processing circuit 234 or the video encoding circuit 236 determines whether the unread data in the target memory block is greater than D2 (or D3) bits. If YES, performing step S1126; if NO, waiting for the control circuit 231 to write data.

Step S1126: The image processing circuit 234 or the video encoding circuit 236 reads D2 (or D3) bits from the target memory block.

Step S1128: The image processing circuit 234 or the video encoding circuit 236 determines whether the total number of bits that it has already read from the target memory block is greater than or equal to the predetermined value. If YES, performing step S1129; if NO, returning to step S1124.

Step S1129: the image processing circuit 234 or the video encoding circuit 236 sets the state of the target memory block to 2.

It can be seen from FIG. 11A and FIG. 11B that the target memory block is used as a ring buffer because the memory block whose state is 1 is written by the control circuit 231 (FIG. 11A) and read by the image processing circuit 234 or the video encoding circuit 236 (FIG. 11B) at the same time.

FIG. 11C includes the following steps.

Step S1132: The image processing circuit 234 or the video encoding circuit 236 selects one of the memory block 232a and the memory block 232b that has the state of 2 as the target memory block. In some circumstances, this step may include the image processing circuit 234 or the video encoding circuit 236 waiting for the state of the memory block 232a or the memory block 232b to change to 2.

Step S1134: The image processing circuit 234 or the video encoding circuit 236 reads D2 (or D3) bits from the target memory block.

Step S1136: The image processing circuit 234 or the video encoding circuit 236 determines whether the total number of bits that it has already read from the target memory block is greater than or equal to the predetermined value. If YES, performing step S1138; if NO, returning to step S1134.

Step S1138: The image processing circuit 234 or the video encoding circuit 236 sets the state of the target memory block to 0.

One of the image processing circuit 234 and the video encoding circuit 236 performs the flow of FIG. 11B, while the other performs the flow of FIG. 11C. For example (see FIG. 7A), at a certain time point when the pixel values of the first row of the image block A(2,1) have been written to the memory block 232a, the control circuit 231 is writing the pixel values of the second row of the image block A(2,1) into the memory block 232a, the image processing circuit 234 is reading the pixel values of the first row of the image block A(2,1) from the memory block 232a, and the video encoding circuit 236 is reading the pixel values of the image block A(1,1) from the memory block 232b.

With the circuit structure of FIG. 10, the image processing circuit 234 and the video encoding circuit 236 can work simultaneously to speed up data processing and output. For example, referring to FIG. 5, the circuit structure of FIG. 10 can generate the frame M(N) (grid) and the frame S1(N) (gray) faster (i.e., the time length between t7 and t5 is shortened) as well as generate the frame Sx(N) (grid) and the frame Sx+1(N) (gray) faster (e.g., the time length between t9 and t7 is shortened). In other words, the circuit structure of FIG. 10 can increase the speed of the process of FIG. 4, meaning that the efficiency of the image processing system 200 is improved.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A video processing circuit generating a video stream and coupled to an external memory which stores partial data of a first frame, the video processing circuit comprising:
   a memory;

a control circuit configured to read a first image block from the external memory and store the first image block in the memory, the first image block being a part of the first frame;

an image processing circuit configured to read the first image block from the memory and process the first image block to generate a second image block, wherein the second image block is a part of a second frame which is different from the first frame; and a video encoding circuit configured to read the first image block from the memory and encode the first image block to generate a part of the video stream;

wherein the image processing circuit further stores the second image block in the external memory, and the control circuit further reads the second image block from the external memory and stores the second image block in the memory;

wherein the video stream is a first video stream, the video processing circuit further generates a second video stream and a third video stream in sequence, and the image processing circuit and the video encoding circuit determine whether to process or encode the second image block according to a frame rate of the second video stream and a frame rate of the third video stream.

2. The video processing circuit of claim 1, wherein when the frame rate of the second video stream is lower than the frame rate of the third video stream, the image processing circuit processes the second image block, but the video encoding circuit does not encode the second image block.

3. The video processing circuit of claim 1, wherein when the frame rate of the second video stream is greater than the frame rate of the third video stream, the video encoding circuit encodes the second image block, but the image processing circuit does not process the second image block.

4. The video processing circuit of claim 1, wherein the image processing circuit further stores the second image block in the external memory, and a resolution of the first frame is different from a resolution of the second frame.

5. The video processing circuit of claim 4, wherein the memory further stores a third image block which is a part of the first frame and adjacent to the first image block, the image processing circuit performing following operations:
calculating an average of X pixels of the first image block and Y pixels of the third image block, X and Y being positive integers, and the X pixels and the Y pixels being consecutive pixels in a row of the first frame.

6. The video processing circuit of claim 4, wherein the memory further stores a third image block which is a part of the first frame and adjacent to the first image block, the image processing circuit performing following operations:
(A) performing calculation on X pixels of the first image block to generate a result; and
(B) performing calculation on Y pixels of the third image block and the result at the same time;
wherein X and Y are positive integers, and the X pixels and the Y pixels are consecutive pixels in a row of the first frame.

7. The video processing circuit of claim 4, wherein the first frame is generated by the image processing circuit.

8. The video processing circuit of claim 4, wherein the first frame is not generated by the image processing circuit, and the first frame is an outcome of a scaling operation.

9. The video processing circuit of claim 1, wherein before the image processing circuit and the video encoding circuit respectively generate the second image block and the part of the video stream, the control circuit writes the first image block into the memory only once.

10. A video processing method for generating a video stream according to a first frame, the method comprising:
reading a first image block from an external memory and storing the first image block in a memory, the first image block being a part of the first frame;
performing a scaling operation in which the first image block is read from the memory and then processed to generate a second image block, wherein the second image block is a part of a second frame which is different from the first frame; and
performing an encoding operation in which the first image block is read from the memory and then encoded to generate a part of the video stream;
wherein before the second image block and the part of the video stream are respectively generated in the scaling operation and the encoding operation, the first image block is written to the memory only once.

11. The video processing method of claim 10 further comprising:
storing the second image block in the external memory;
reading the second image block from the external memory; and
storing the second image block in the memory.

12. The video processing method of claim 10 further comprising:
storing the second image block in the external memory;
wherein a resolution of the first frame is different from a resolution of the second frame.

13. The video processing method of claim 12, wherein the memory further stores a third image block which is a part of the first frame and adjacent to the first image block, the scaling operation further comprising:
calculating an average of X pixels of the first image block and Y pixels of the third image block, X and Y being positive integers, and the X pixels and the Y pixels being consecutive pixels in a row of the first frame.

14. The video processing method of claim 12, wherein the memory further stores a third image block which is a part of the first frame and adjacent to the first image block, the scaling operation further comprising:
(A) performing calculation on X pixels of the first image block to generate a result; and
(B) performing calculation on Y pixels of the third image block and the result at the same time;
wherein X and Y are positive integers, and the X pixels and the Y pixels are consecutive pixels in a row of the first frame.

15. A video processing circuit generating a video stream and coupled to an external memory which stores partial data of a first frame, the video processing circuit comprising:
a memory;
a control circuit configured to read a first image block from the external memory and store the first image block in the memory, the first image block being a part of the first frame;
an image processing circuit configured to read the first image block from the memory and process the first image block to generate a second image block, wherein the second image block is a part of a second frame which is different from the first frame; and
a video encoding circuit configured to read the first image block from the memory and encode the first image block to generate a part of the video stream;
wherein before the image processing circuit and the video encoding circuit respectively generate the second image block and the part of the video stream, the control circuit writes the first image block into the memory only once.

\* \* \* \* \*